United States Patent [19]

Kim et al.

[11] Patent Number: 5,607,357
[45] Date of Patent: Mar. 4, 1997

[54] VIDEO APPARATUS HAVING A GAME FUNCTION

[75] Inventors: Jong W. Kim; Jeong W. Lee; Bok H. Baik, all of Kyungki-do, Rep. of Korea

[73] Assignee: Goldstar Co., Ltd., Seoul, Rep. of Korea

[21] Appl. No.: 343,894

[22] Filed: Nov. 17, 1994

[30] Foreign Application Priority Data

Nov. 17, 1993 [KR] Rep. of Korea ............... 24511/1993

[51] Int. Cl.⁶ ........................................ A63F 9/22
[52] U.S. Cl. ................................. 463/40; 463/43
[58] Field of Search .................... 463/36, 37, 38, 463/39, 40, 41, 42, 43, 44, 45; 273/148 B

[56] References Cited

U.S. PATENT DOCUMENTS

| | | | |
|---|---|---|---|
| 4,618,146 | 10/1986 | Yoshida et al. | 463/38 |
| 5,350,176 | 9/1994 | Hochstein et al. | 463/42 |
| 5,364,108 | 11/1994 | Esnouf | 463/43 X |
| 5,429,363 | 7/1995 | Hayashi | 463/40 |

*Primary Examiner*—William H. Grieb
*Attorney, Agent, or Firm*—Fish & Richardson P.C.

[57] ABSTRACT

A video apparatus comprises both a video cassette recorder for recording or reproducing a video signal from an external source and a game signal processing part for executing a game program. A remote-controlled transmitter transmits a signal to a remote-controlled receiver. A decoder decodes the signal and a microprocessor selects either game mode or VCR mode which is output via a RF modulator to a video screen. At least one encoder and processor is provided which enables the system to process game signals and output the video signal in game mode to the video screen.

17 Claims, 7 Drawing Sheets

VCR MODE

GAME MODE

VCR MODE

GAME MODE

VIDEO APPARATUS HAVING A GAME FUNCTION

BACKGROUND OF THE INVENTION

The present invention relates to an apparatus having a game function wherein a video apparatus and an electronic game device are integrally combined as a single product, each sharing a common circuit, and more particularly, to a video apparatus having a game function which allows a video apparatus such as a video cassette recorder (VCR) or television (TV) receiver and a game device to be used at the same time.

Conventionally, a video apparatus such as a VCR or TV receiver and a game device are each separately used as individual products. These individual products are independently connected to a monitor to be used as necessary.

For example, a combined structure of a video apparatus and an electronic game device will be described with reference to FIG. 1, which is constituted by a remote-controlled receiver 1 for controlling a video cassette recorder (VCR) remotely, a microcomputer 2 for receiving a signal from the remote-controlled receiver 1 and a system control signal and then performing a record and reproduction of a video signal, a playback 3 for being controlled by the microcomputer 2 and then performing a record and reproduction of a video signal, a modulator 4 for modulating and outputting the output of the playback or antennae reception signal ANT, a VCR power source 5 for supplying power to the remote-controlled receiver 1, microcomputer 2, playback 3 and modulator 4, a game unit 6 for receiving a control signal for a game device and then performing a predetermined electronic game program, a modulator 7 for modulating and outputting an output signal of the game unit 6, a game power source 8 for supplying power to the game unit 6 and modulator 7, and a switch 9 for selectively supplying to a monitor the outputs of the modulators 4 and 7.

The conventional VCR and game device having the aforementioned configurations which are independent from each other, are operated by the microcomputers 2 and 6 which are their respective processors. Their output signals are also modulated by the respective modulators 4 and 7 to then be output, and power is supplied independently from the respective power sources 5 and 8 to operate the devices. That is for a VCR, an user's key instruction received from the remote-controlled receiver 1 and a system control signal are decoded in the microcomputer 2 to control the playback 3. The playback 3 performs record and reproduction of a video signal under the control of microcomputer 2. A signal received from antennae ANT or a signal output from the playback 3 is modulated by the modulator 4 to then be supplied to one input port of the switch 9. At this time, power of the respective circuits 1, 2, 3 and 4 is supplied from a VCR dedicated power source 5.

Meanwhile, for a game device, a control signal for a game device is applied from a handset for performing a game on the game unit 6. Game unit 6 performs an electronic game program according to the input signal to then output a video signal. The output video signal is modulated by the modulator 7 to then be supplied to another input port of the switch 9. At this time, power of the respective circuits 6 and 7 is supplied from the game device dedicated power source 8.

As described above, the video signal output from the VCR or the game device is selectively supplied to a monitor by the selection depending on a user's manipulation of the switch 9, so that an image is displayed.

However, as described above, the conventional video apparatus and electronic game device are each independently produced as separate products, and the signals output from the two devices are selected by a user's switch manipulation to be supplied to a monitor. This involves problems such as heavy economic burden for buying the respective devices, inconvenience in selecting and manipulating devices, and low efficiency of utilizing circuits due to separate installments of processor, modulator or power source which can be all commonly used.

SUMMARY OF THE INVENTION

It is an object of the present invention to provide a single product combining a video apparatus and a game device by jointly having a processor, modulator and power source and by selectively supplying the outputs to a monitor in response to a user's selection, and a video apparatus having a game function which can save buying cost and improve utility efficiency by simplifying the circuit thereof.

To accomplish the above object, the video apparatus according to a first embodiment of the present invention, is comprised of a remote-controlled transmitter for transmitting a remote control signal with respect to a VCR mode and a game mode, a remote-controlled receiver for receiving a remote control signal of the remote-controlled transmitter, a decoder for decoding a control signal received from the remote-controlled receiver, an encoder for encoding the output of the decoder in case of a game mode, a microcomputer for controlling record/reproduction of a video signal in the case of a VCR mode, or for controlling the output of the decoder to be transmitted to the encoder in case of a game mode, when the output of the decoder is interpreted, a game signal processor for performing an electronic game program by a game control signal encoded by the encoder and then outputting a video signal, a video signal processor for reproducing/outputting or recording/processing the video signal under the control of the microcomputer, a selection unit for selecting and outputting the output of the game signal processor or video signal processor under the control of the microcomputer, and a RF modulator for modulating a signal selected and output from the selection unit.

According to a second embodiment of the present invention, the video apparatus further comprises a switch connected between the remote-controlled receiver and encoder for being turned on and off, thereby controlling a video signal to be recorded/reproduced in case of a VCR mode, or controlling switch to be turned on in case of a game mode, when the output of the decoder is interpreted by the microcomputer.

According to a third embodiment of the present invention, the video apparatus further comprises a plurality of game signal processors each being packaged and able to be separated from and combined with the main circuit unit. If a user selects and combines one of the plurality of game signal processors with the main circuit unit, an electronic game program is performed by the game control signal and the video signal for amusement is then output.

The video apparatus further comprises a plurality of encoders (one encoder in a first embodiment). Among the plurality of encoders, the corresponding encoder encodes and outputs the output of the decoder so that the game signal processor is combined with the main circuit unit among the plurality of game signal processors, in case of a game mode. Also, according to a third embodiment of the present invention, the microcomputer of the first embodiment controls record/reproduction of a video signal in case of a VCR mode when the output of the decoder is interpreted, or processes the output of the decoder via the encoder corresponding to game signal processor which is selected by the user and is combined, among the plurality of encoders, in case of a game mode.

The video apparatus according to a fourth embodiment further includes a switch between remote-controlled receiver and plurality of encoders, as in the third embodiment, and allows the microcomputer to control the switch so that the corresponding encoder among the plurality of encoders is selected.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Hereinafter, the configuration of the video apparatus having a game function according to the present invention and the operations thereof will be described with reference to the accompanying drawings.

Figure 1:
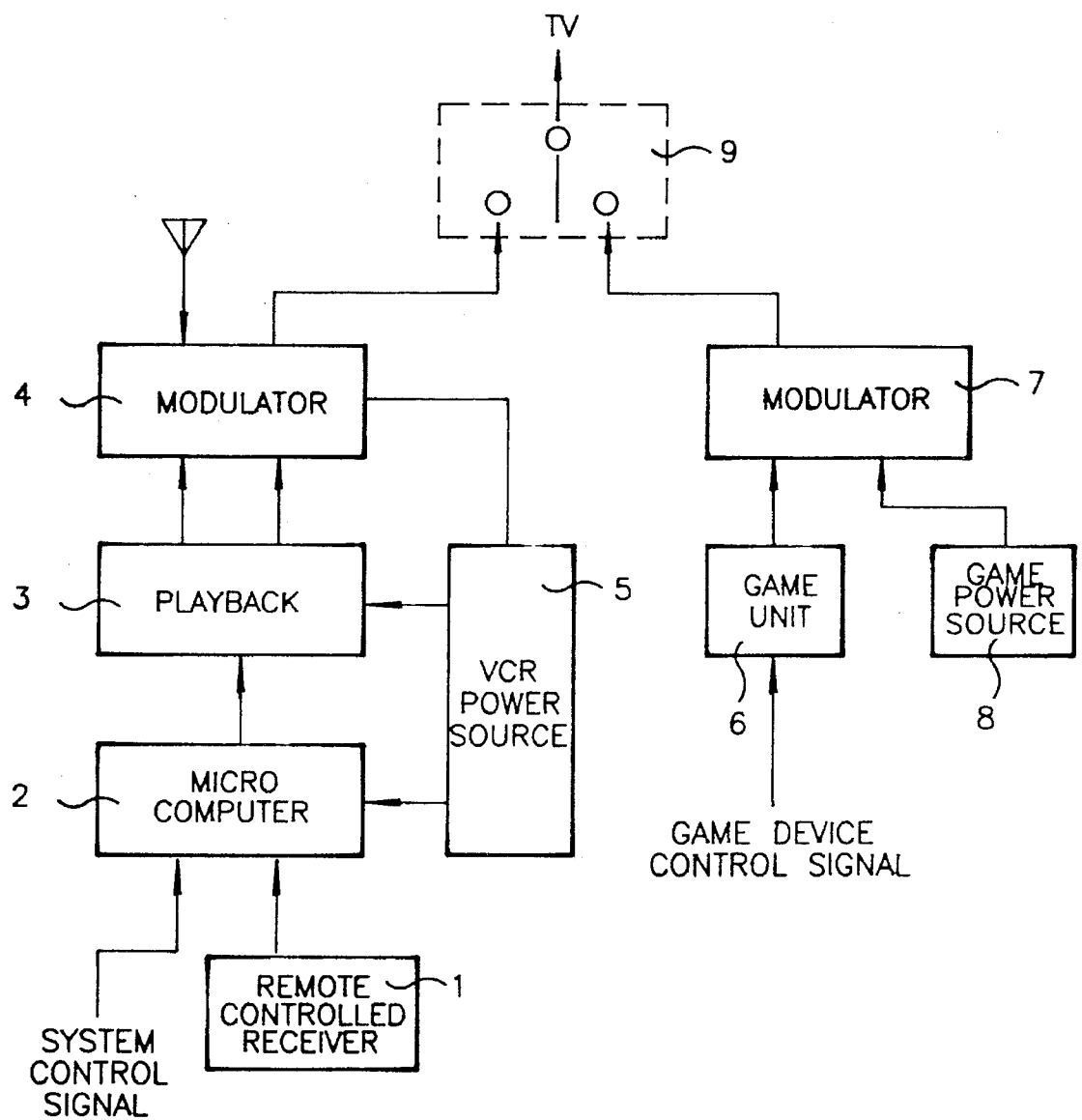
FIG. 1 is a circuit diagram showing the connection of a conventional VCR and a game device.
Figure 2:
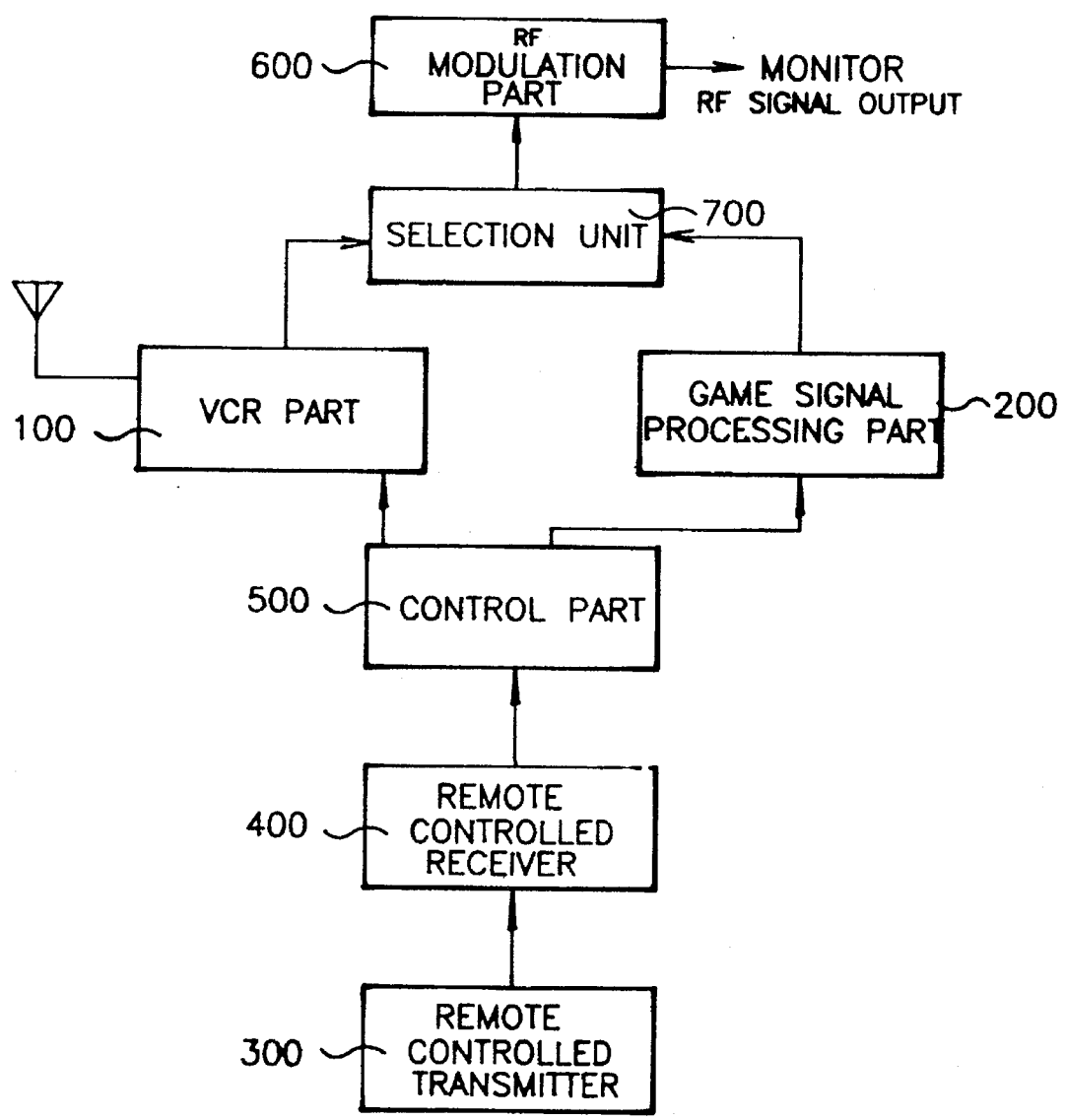
FIG. 2 is a block diagram showing a VCR having a game function according to the present invention.

FIG. 2 is a block diagram showing a VCR having a game function.

Referring to FIG. 2, the VCR having a game function comprises a video cassette Recorder(VCR) part 100 for recording or reproducing a video signal from an external input terminal or an antenna, a game signal processing part 200 for executing a game program to process a video signal for a game and then output the processed video signal from the game, a remote-controlled transmitter 300 for transmitting a remote control signal for VCR mode or game mode from a remote place, a remote-controlled receiver 400 for receiving the remote control signal from the remote-controlled transmitter 300, a control part 500 for controlling the VCR part 100 or the game signal processing part 200 in accordance with the remote control signal from the remote controlled receiver 400, a RF modulator 600 for modulating a reproduced video signal from the VCR part 100 or a video signal from the game from the game signal processing part 200, and a selection unit 700 for selecting one of the reproduced video signals from the VCR part 100 and the game signal processing part 200 and providing the selected one to the RF modulator 600.

Figure 3:
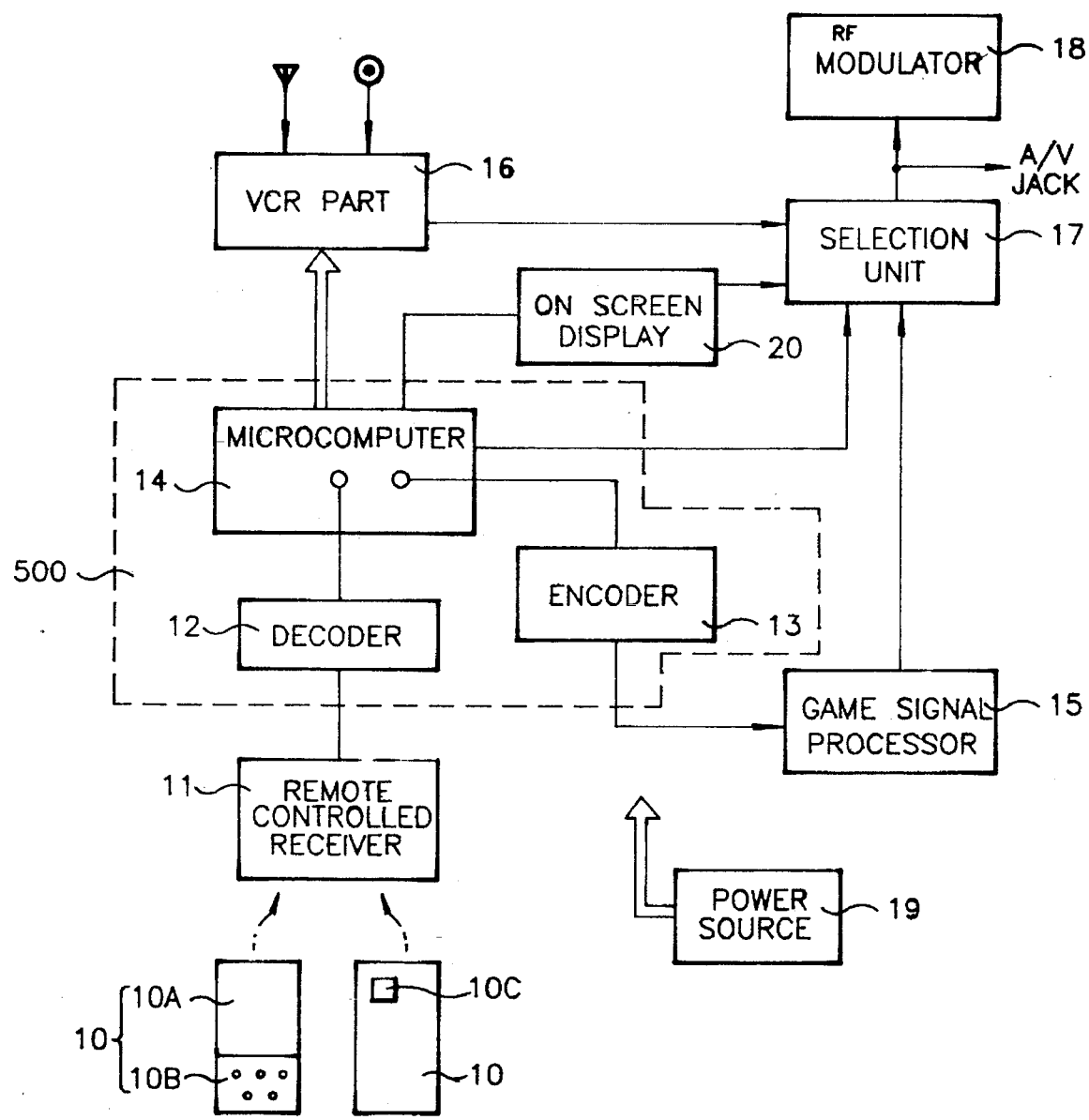
FIG. 3 is a block diagram showing a first embodiment of a VCR having a game function according to the present invention.

FIG. 3 also shows a first embodiment of the present invention where the apparatus according to the present invention is adopted for a VCR. Referring to FIG. 3, a VCR having a game function according to the present invention includes a remote-controlled transmitter 10 for transmitting a remote control signal for a VCR mode or game mode, a remote-controlled receiver 11 for receiving the remote control signal from the remote-controlled transmitter 10, a decoder 12 for decoding the control signal received via the remote-controlled receiver 11, an encoder 13 for encoding the output of the decoder 12 in case of a game mode, a microcomputer 14 for switching the output of the decoder 12 to control record/reproduction of the video signal, in case of a VCR mode when the output of the decoder 12 is interpreted, or to transmit the output of the decoder 12 to the encoder 13, in case of a game mode, a game signal processor 15 for performing an electronic game program by a control signal with respect to the game mode encoded by the encoder 13 and for outputting a video signal for amusement, a VCR part 16 for reproducing the signal under the control of the microcomputer 14 and to output the same or for record processing the same, a selection unit 17 for selecting the output of the VCR part 16 and outputting the same, a RF modulator 18 for modulating a signal selected and output by the selection unit 17, a power source 19 for supplying power to the respective parts of the circuit, and an on screen display 20 for forming an on screen display screen and outputting the same via the selection unit 17 by the control of the microcomputer 14. Referring to FIG. 3, the control part 500 of FIG. 2 comprises the decoder 12, the encoder 13 and the microcomputer 14.

At this time, the remote-controlled transmitter 10 includes a VCR key unit 10A for a VCR control and a game key unit 10B for a game control, or includes a mode selection key 10C for selecting a VCR mode or a game mode.

The operation of the VCR having a game function according to an embodiment of the present invention, having the aforementioned configuration, will now be described.

If a user manipulates a key of the remote controlled transmitter 10 to transmit a remote control signal, remote controlled receiver 11 receives the signal and transmits it to the decoder 12. Decoder 12 decodes the signal and transmits it to the microcomputer 14. Microcomputer 14 interprets the received key code values and determines whether it is a VCR mode or a game mode.

Remote controlled transmitter 10 transmits a remote controlled signal representing a VCR mode and a remote controlled signal representing a game mode in a different way, so that the microcomputer 14 can determine whether the received value is VCR mode or game mode.

Figure 4A:
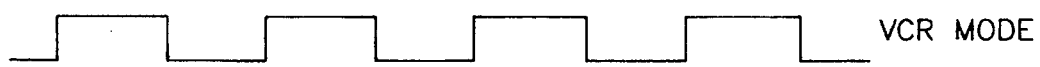
FIGS. 4A–4D are waveform diagrams showing remote control signals adopted for the present invention.
Figure 4B:

That is as shown in FIGS. 4A and 4B, if VCR mode control signal and game mode control signal are transmitted with different pulsewidths, the decoder 12 checks a duty of the input control signal, turns it into a logic depending on duty value and then transmits to the microcomputer 14. Microcomputer 14 receives the same and determines whether it is a VCR mode or a game mode.

Figure 4C:
Figure 4D:

Also, as shown in FIGS. 4C and 4D, if VCR mode control signal and game mode control signal are transmitted with their pulthwidths being differently, the decoder 12 counts the number of pulse of the input control signal, turns this into a logic depending on counted value, and then transmits to microcomputer 14. Thus, the microcomputer 14 receives the signal and can determine whether the mode is a VCR mode or a game mode.

If the value is a key code value pressed via the VCR key unit 10A, or a VCR mode selected key code value selected through the mode selection key 10C as shown in the configuration of the remote controlled transmitter 10A, the microcomputer 14 controls the VCR part 16 by the operation corresponding to the code value according to the configuration of the remote controlled transmitter 10, and performs the video signal processing of the VCR. At the same time the microcomputer switches the selection unit 17 for record and reproduction to transmit the video signal output from the VCR part 16 to the RF demodulator 18. As the result of the determination, if the value is a key code value pressed via the game key unit 10b, or a key code value by which a game mode is selected by the selection of the mode selection key 10C, the microcomputer 14 controls the VCR part 16 by the operation corresponding to the code value according to the configuration of the remote controlled transmitter 10, and performs the video signal processing of the VCR. At the same time, the microcomputer switches the selection unit 17 for record and reproduction to transmit the video signal output from the VCR part 16 to transmit to the RF demodulator 18.

Encoder 13 performs an encoding process with respect to the game control signal transmitted from decoder 12 for converting the game control signal into that of the control method, code, type or speed of the game signal processor 15 to thereby allow the game signal processor 15 to recognize the game signal.

Game signal processor 15 performs an electronic game program according to the control of the encoded game control signal to transmit a video signal to switching unit 15 so that the signal is modulated by the RF modulator 18.

The required power is supplied to the respective parts of circuit from one power source 19. Meanwhile, as the result of interpretation of key code values of the microcomputer 14, if the on screen display is necessary, the on screen display 20 is controlled to form an on screen picture, and the selection unit 17 is switched to the on screen display 20 so that the video signal of the on screen picture is output.

As described above, the video signal selected by the selection unit 17 under the control of the microcomputer 14 is output via audio/video jack or is modulated by the RF modulator 18 to then be supplied to TV set, thereby enabling an user's selected function, i.e., VCR or game screen, to be output as a TV screen.

Figure 5:
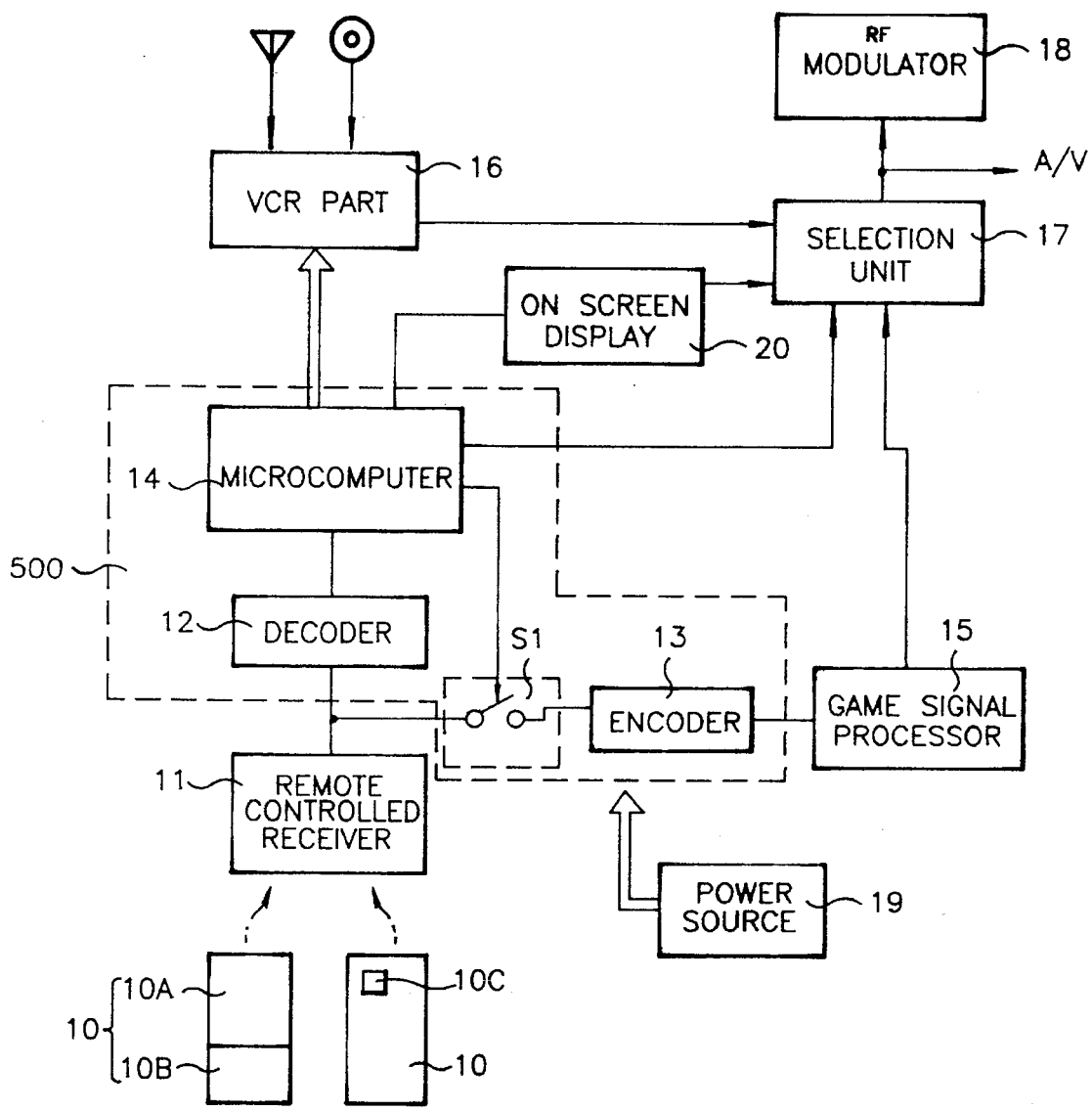
FIG. 5 is a block diagram showing a second embodiment of a VCR having a game function according to the present invention.

FIG. 5 is a second embodiment for which the apparatus according to the present invention is adopted. An on/off switch S1 is connected between the remote controlled receiver 11 and encoder 13 shown in FIG. 3 and is on/off-controlled by the microcomputer 14. The operation of on/off switch S1 will now be described. Referring to FIG. 5, the control part 500 comprises the decoder 12, the encoder 13, the microcomputer 14 and the switch S1.

First, a user manipulates keys of the remote controlled transmitter 10 to transmit a remote control signal and the remote controlled receiver 11 receives and transmit the signal to the decoder 12. Then, the decoder 12 decodes the signal to transmit it to the microcomputer 14. Microcomputer 14 interprets the input key value and determines whether it is a VCR mode or a game mode.

If the result value determined by the microcomputer 14 is a key code value with respect to a VCR mode, the operation of the VCR mode described in FIG. 3 is controlled. If the result value determined by the microcomputer 14 is a key code value with respect to a game mode, the switch S1 is turned on and the selection unit 17 is controlled at the same time. Thus, the selection unit 17 is switched to the game signal processor 15.

Therefore, in case of a game mode, the game control signal received from the remote controlled receiver 11 is directly transmitted to the encoder 13 and is converted into a signal which can be recognized by the game signal processor 15 by means of the encoder 13. Game signal processor 15 performs an electronic game program by the control of the game control signal to transmit a video signal to the selection unit 17.

As in the first embodiment of the present invention, the remote controlled transmitter 10 transmits remote control signal with its pulsewidths or the number of pulse being made differently, or is constituted by a VCR key unit 10A and a game key unit 10B, or a mode selection key 10C, in a second embodiment.

Also, in the case where game signal processor 15 is packaged, a connector which can be detached from and attached to the main circuit unit is linked between packaged game signal processor 15 and encoder 13, thereby allowing a game device to attach to or detach from the main circuit unit easily.

Figure 6A:
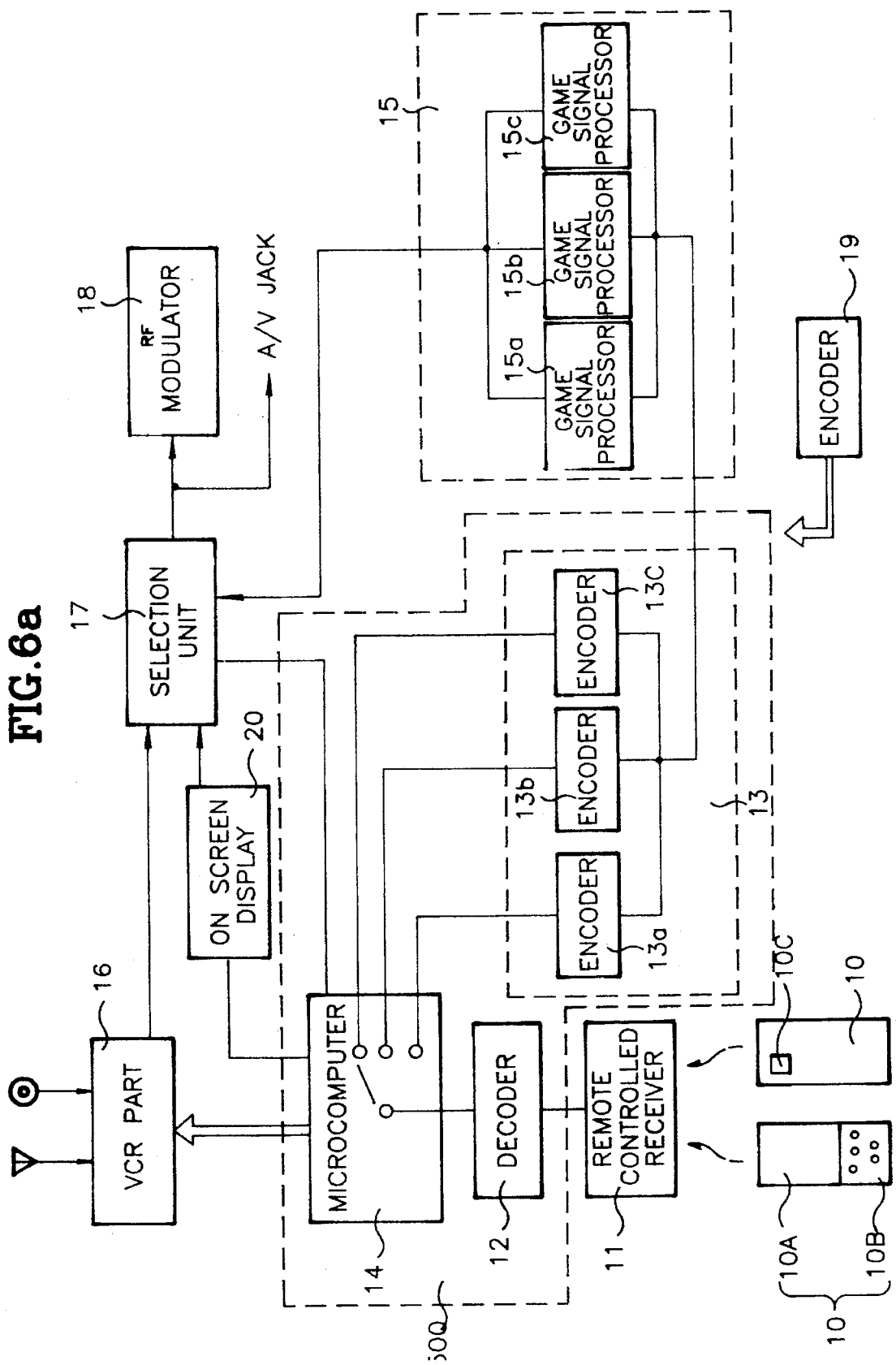
FIGS. 6A and 6B are block diagrams showing third and fourth embodiments respectively of a VCR having a game function according to the present invention.
Figure 6B:
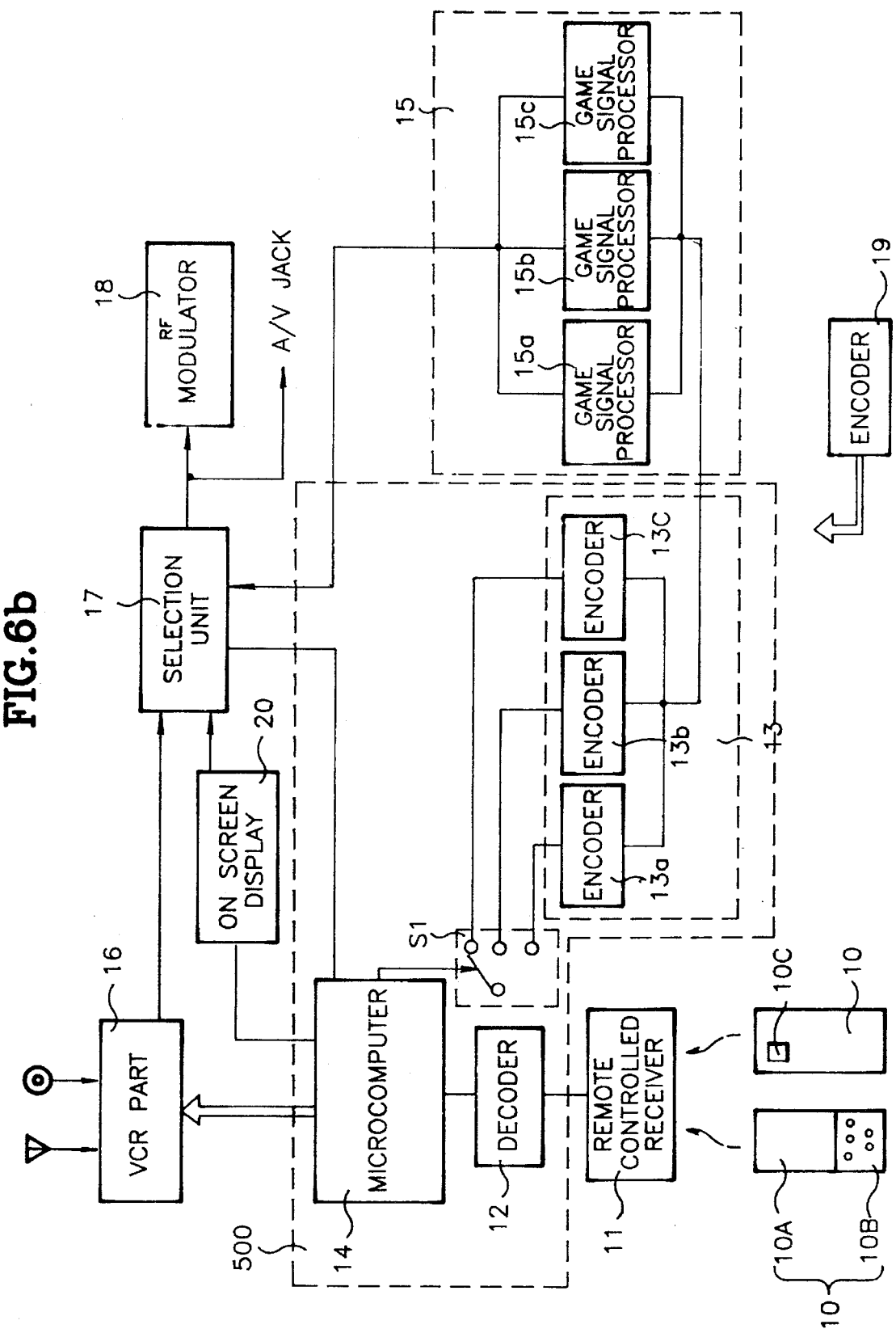

FIGS. 6A and 6B show third and fourth embodiments of the present invention and further include a plurality of encoders 13, as compared to configurations shown in FIGS. 3 and 5. The reason for such a configuration is that since the game signal processor 15 is different in control method, code, type or speed for the respective game manufacturers, such as Nintendo, Sega, or Namco, the game control signal output from the decoder 12 shown in FIG. 3 and the game control signal output from the remote controlled receiver 11 shown in FIG. 5 should be encoded to be suitably recognized by the game signal processors 15a produced by the respective manufacturers.

That is to say, encoders 13a, 13b and 13c for encoding the game control signals output from the decoder 12 are adapted to be recognized by the game signal processors 15a, 15b and 15c manufactured by Nintendo, Sega and Namco, respectively.

At this time, the aforementioned game signal processors 15, 15b and 15c are connected with each output port of the encoders 13a, 13b and 13c by a connector so as to be detachable and attachable when a user selects and connects one of the game signal processors 15a, 15b and 15c of the respective manufacturers. Referring to FIG. 6A, the control part(500) of FIG. 2 comprises the decoder 12, three encoders 13a, 13b, 13c and the microcomputer 14.

Referring to FIG. 6B, the control part 500 of FIG. 2 comprises the decoder 12, three encoders 13a, 13b, 13c, the microcomputer 14 and the switch S1.

The third and fourth embodiments of the present invention having the aforementioned configuration will now be described.

First, FIG. 6A showing a third embodiment of the present invention will be explained. A user manipulates keys of the remote controlled transmitter 10 to transmit a remote control signal. The remote control signal is transmitted together with data for allowing the microcomputer 14 to determine whether the mode is a VCR mode or a game mode, and further data telling which manufacturer's product is adopted for the game mode, in case of a game mode.

Remote control receiver 11 receives the remote control signal and transmits it to the decoder 12. Decoder 12 decodes the signal and transmits it to the microcomputer 14. Microcomputer 14 interprets an input key code value and controls the VCR mode operation described in FIG. 2 if the input value represents a VCR mode. However, if the input value represents a game mode, the microcomputer 14 detects which manufacturer's product is used as the game signal processor 15.

If the user connects the game signal processor 15a by Nintendo to the output ports of the encoder 13, the microcomputer 14 switches the output of the decoder 12 so as to be transmitted to encoder 13a, and switches selection unit 17 to the game signal processor 15a.

Encoder 13a performs an encoding operation by which the game control signal transmitted from the decoder 12 is converted into that by the control method, code, type or speed of the game control signal processor 15a by Nintendo, to transmit to the game signal processor 15a by Nintendo.

Therefore, the game signal processor 15a by Nintendo performs an electronic game program under the control of the encoded game control signal and transmits to a video signal to the selection unit 17.

Similarly, if the user connects the game signal processor 15b by Sega, to the output ports of the encoder 13, the microcomputer 14 switches the output of the decoder 12 so as to be transmitted to the encoder 13b, and switches the selection unit 17 to the game signal processor 15b. If the user connects the game signal processor 15c by Namco, to the output ports of the encoder 13, the microcomputer 14 switches the output of the decoder 12 so as to be transmitted to the encoder 13c, and switches selection unit 17 to the game signal processor 15c. Thus, the game control signal is encoded to be suitable for each product of the respective manufacturers by the encoders 13b and 13c.

FIG. 6B showing a fourth embodiment of the present invention will now be explained.

If the user manipulates keys of the remote controlled transmitter 10 to transmit data representing a game mode and data regarding the manufacturers of the products which is adopted for the game mode, together with a remote control signal, remote controlled receiver 11 receives the data and transmits it to the decoder 12.

Decoder 12 decodes the signal transmits it to the microcomputer 14. Microcomputer 14 interprets the input key value. Then, if the result value is a game mode of the game signal processor 15a manufactured by Nintendo, the microcomputer 14 switches the switch S1 so that the output of the remote controlled receiver 11 is transmitted to the encoder 13a. If the result value is a game mode of the game signal processor 15b or 15c manufactured by Sega or Namco, respectively, the microcomputer 14 switches the switch S1 so that the output of the remote controlled receiver 11 is transmitted to the encoder 13b or 13c respectively, and controls the selection unit 17 at the same time so that it is switched to the appropiate game signal processor 15a, 15b or 15c.

In the third and fourth embodiments of the present invention, as in the first embodiment of the present invention, the remote controlled transmitter 10 transmits remote control signals with the pulsewidths thereof or number of pulses thereof being made differently, or is constituted by a VCR key unit 10A and a game key unit 10B, or a mode selection key 10C, in order to differentiate a VCR mode and game mode.

The aforementioned embodiments show the adoption of the apparatus according to the present invention to a VCR. However, the same can apply for a television receiver.

Therefore, since one single product according to the present invention has the effect of purchasing the electronic game devices manufacturered by various manufacturers, the cost can be reduced. Also, since the selection of a video apparatus like a VCR or television receiver, or a game device is automatically accomplished by a microcomputer of the video apparatus, it is convenient to use. Moreover, since a processor, power circuit or modulating circuit are used in common, the circuit becomes simplified.

Although the present invention has been fully described by way of example with reference to the accompanying drawings, it is to be understood that various changes and modifications will be apparent to those skilled in the art. Therefore, unless such changes depart from the scope of the invention as defined by this specification and claims, they should be construed as being included herein.

What is claimed is:

1. A video apparatus having a game function comprising:
   a VCR part for recording or reproducing a video signal from an external input terminal or an antenna;
   a game signal processing part for executing a game program to process a video signal for a game and then output the processed video signal for the game;
   a remote-controlled transmitter for transmitting a remote control signal for VCR mode or game mode from a remote place;
   a remote-controlled receiver for receiving the remote control signal from the remote-controlled transmitter;
   a control part for controlling the VCR part or the game signal processing part in accordance with the remote control signal from the remote-controlled receiver; and
   a RF modulator for modulating a reproduced video signal from the VCR part or a video signal for the game from the game signal processing part.

2. A video apparatus having a game function as claimed in claim 1, further comprising a selection unit for selecting one of the reproduced video signal from the VCR part and the video signal for game from the game signal processing part and then providing the selected signal to the RF modulator.

3. A video apparatus having a game function comprising:
   a remote-controlled transmitter for transmitting a remote control signal with respect to a VCR mode and a game mode;
   a remote-controlled receiver for receiving a remote control signal of said remote-controlled transmitter;
   a decoder for decoding a control signal received from said remote-controlled receiver;
   an encoder for encoding the output of said decoder in case of a game mode;
   a microcomputer for controlling record/reproduction of a video signal in the case of a VCR mode, or for controlling the output of said decoder to be transmitted to said encoder in case of a game mode, when the output of said decoder is interpreted;
   a game signal processor for performing an electronic game program by a game control signal encoded by said encoder and then outputting a video signal;
   a VCR part for reproducing/outputting or recording/processing the video signal under the control of said microcomputer; and
   a RF modulator for modulating the output signal of said game signal processor or VCR part under the control of said microcomputer.

4. A video apparatus having a game function as claimed in claim 3, wherein said remote controlled transmitter includes a VCR key unit for a VCR control and a game key unit for a game control.

5. A video apparatus having a game function as claimed in claim 3, wherein said remote controlled transmitter includes a mode selection key for selecting a VCR mode or a game mode.

6. A video apparatus having a game function as claimed in claim 3, wherein said remote controlled transmitter is adapted to transmit a VCR mode control signal and a game mode control signal, each of said signals having a different pulsewidth.

7. A video apparatus having a game function as claimed in claim 3, wherein said remote controlled transmitter is adapted to transmit a VCR mode control signal and a game mode control signal, each of said signals having a different number of pulses.

8. A video apparatus having a game function as claimed in claim 3, wherein said decoder performs decoding by checking the duty of an input signal.

9. A video apparatus having a game function as claimed in claim 3, wherein said decoder performs decoding by counting the number of pulses of an input signal.

10. A video apparatus having a game function as claimed in claim 3, wherein there is provided a connector which is detachable and attachable between said packaged game signal processor and said encoder so that a game device can be easily attached or detached.

11. A video apparatus having a game function as claimed in claim 4, wherein said remote controlled transmitter is adapted to transmit a VCR mode control signal and a game mode control signal, each of said signals having a different pulsewidth.

12. A video apparatus having a game function as claimed in claim 4, wherein said remote controlled transmitter is adapted to transmit a VCR mode control signal and a game mode control signal, each of said signals having a different number of pulses.

13. A video apparatus having a game function as claimed in claim 5, wherein said remote controlled transmitter is adapted to transmit a VCR mode control signal and a game mode control signal, each of said signals having a different pulsewidth.

14. A video apparatus having a game function as claimed in claim 5, wherein said remote controlled transmitter is adapted to transmit a VCR mode control signal and a game mode control signal, each of said signals having a different number of pulses.

15. A video apparatus having a game function comprising:

a remote-controlled transmitter for transmitting a remote control signal with respect to a VCR mode and a game mode;

a remote-controlled receiver for receiving a remote control signal transmitted by said remote-controlled transmitter;

a decoder for decoding a control signal received from said remote-controlled receiver;

an encoder for encoding the output of said decoder in case of a game mode;

a switch connected between said remote control receiver and said encoder;

a microcomputer for controlling record/reproduction of a video signal in the case of a VCR mode, and for controlling the output of said decode to be transmitted to said encoder in case of a game mode, when the output of said decoder is interpreted;

a game signal processor for performing an electronic game program by a game control signal encoded by said encoder and then outputting a video signal;

a VCR part for reproducing/outputting or recording/processing the video signal under the control of said microcomputer; and a RF modulator for modulating the output of said game signal processor or VCR part under the control of a said microcomputer.

16. A video apparatus having a game function comprising:

a remote-controlled transmitter for transmitting a remote control signal with respect to a VCR mode and a game mode;

a remote-controlled receiver for receiving a remote control signal of said remote-controlled transmitter;

a decoder for decoding a control signal received from said remote-controlled receiver;

a plurality of game signal processors each being packaged, and adapted to be attachable to a main circuit unit, thereby performing an electronic game program if a user selects one of said plurality of game signal processors and outputting a video signal;

a plurality of encoders for encoding the output of said decoder to a signal which can be recognized by one of said game signal processors combined with said main circuit unit among said plurality of game signal processors, in case of a game mode, and then outputting the same;

a microcomputer for controlling record/reproduction of a video signal in the case of a VCR mode and for selecting an encoder for encoding the output signal of said decoder into a signal which can be recognized by one of said game signal processors and for connecting the output of said decoder to said selected encoder;

a VCR part for reproducing/outputting or recording/processing the video signal under the control of said microcomputer; and a RF modulator for modulating the output of said game signal processor or VCR part under the control of said microcomputer.

17. A video apparatus having a game function comprising:

a remote-controlled transmitter for transmitting a remote control signal with respect to a VCR mode and a game mode;

a remote-controlled receiver for receiving a remote control signal of a said remote-controlled transmitter;

a decoder for decoding a control signal received from said remote-controlled receiver;

a plurality of game signal processors each being packaged, and which is detachable and attachable to and from a main circuit unit, thereby performing an electronic game program if a user selects one of said plurality of game signal processors and outputting a video signal;

a plurality of encoders for encoding the output of said decoder to a signal which can be recognized by one of said game signal processors combined with said main circuit unit among said plurality of game signal processors, in case of a game mode, and then outputting the same;

a switch connected between said remote control receiver 11 and said plurality of encoders for selecting one encoder from said plurality of encoders in case of a game mode;

a microcomputer for controlling record/reproduction of a video signal in the case of a VCR mode, when the output of said decoder is interpreted, and for controlling said switch so as to select an encoder for encoding the output signal of said decoder into a signal which can be recognized by said game signal processor in the case of a game mode;

a VCR part for reproducing/outputting or recording/processing the video signal under the control of said microcomputer; and a RF modulator for modulating the output of said game signal processor or said VCR part under the control of said microcomputer.

* * * * *